(12) United States Patent
Yamano et al.

(10) Patent No.: US 11,811,113 B2
(45) Date of Patent: Nov. 7, 2023

(54) OPERATING METHOD OF FUEL CELL SYSTEM

(71) Applicant: HONDA MOTOR CO., LTD., Tokyo (JP)

(72) Inventors: Naoki Yamano, Wako (JP); Takuya Tamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 45 days.

(21) Appl. No.: 17/679,144

(22) Filed: Feb. 24, 2022

(65) Prior Publication Data

US 2022/0320549 A1    Oct. 6, 2022

(30) Foreign Application Priority Data

Mar. 31, 2021    (JP) ................. 2021-061605

(51) Int. Cl.
*H01M 8/04* (2016.01)
*H01M 8/04746* (2016.01)
*H01M 8/0432* (2016.01)
*H01M 8/04007* (2016.01)
*H01M 8/04029* (2016.01)

(52) U.S. Cl.
CPC ... *H01M 8/04768* (2013.01); *H01M 8/04029* (2013.01); *H01M 8/04074* (2013.01); *H01M 8/04358* (2013.01); *H01M 2250/20* (2013.01)

(58) Field of Classification Search
CPC ......... H01M 8/04768; H01M 8/04029; H01M 8/04074; H01M 8/04358; H01M 2250/20
USPC ....................................................... 429/437
See application file for complete search history.

(56) References Cited

U.S. PATENT DOCUMENTS

2021/0119234 A1*   4/2021   Farhat .................. H01M 10/46

FOREIGN PATENT DOCUMENTS

| JP | 2000-173638 | 6/2000 |
| JP | 2006-049137 | 2/2006 |
| JP | 2006-049140 | 2/2006 |
| JP | 2006-302746 | 11/2006 |

(Continued)

OTHER PUBLICATIONS

Japanese Office Action for Japanese Patent Application No. 2021-061605 dated Jan. 4, 2023.

*Primary Examiner* — James M Erwin
(74) *Attorney, Agent, or Firm* — AMIN, TUROCY & WATSON, LLP (57) ABSTRACT

An operating method of a fuel cell system which includes a plurality of fuel cell stacks; a refrigerant passage configured to circulate a refrigerant circulated in a first fuel cell stack among the plurality of fuel cell stacks through a second fuel cell stack among the plurality of fuel cell stacks; and a first temperature acquisition unit and second temperature acquisition unit configured to acquire a temperature of the refrigerant downstream of the first fuel cell stack and upstream of the second fuel cell stack, includes, when the temperature of the refrigerant acquired by the first temperature acquisition unit and the second temperature acquisition unit is equal to or lower than a predetermined temperature, after start of the first fuel cell stack and after elapse of a delay time, starting the second fuel cell stack, and variably setting the delay time according to the temperature of the refrigerant.

3 Claims, 8 Drawing Sheets

(56) References Cited

FOREIGN PATENT DOCUMENTS

| | | |
|---|---|---|
| JP | 2011-008916 | 1/2011 |
| JP | 2015-065718 | 4/2015 |
| JP | 2015-153563 | 8/2015 |
| JP | 2020-092030 | 6/2020 |
| WO | 2014/174982 | 10/2014 |

* cited by examiner

OPERATING METHOD OF FUEL CELL SYSTEM

CROSS-REFERENCE TO RELATED APPLICATION

Priority is claimed on Japanese Patent Application No. 2021-061605, filed Mar. 31, 2021, the content of which is incorporated herein by reference.

BACKGROUND OF THE INVENTION

Field of the Invention

The present invention relates to an operating method of a fuel cell system.

Description of Related Art

A stacked battery is equipped with a cooling device for cooling. The cooling device includes a circulation passage for circulating cooling water through the stacked battery, and a pump provided in the circulation passage to supply the cooling water to the stacked battery. An opening and closing unit that closes a bypass passage when starting the pump and opens the bypass passage depending on a heat generation state of the stacked battery is known (see, for example, PCT International Publication No. WO2014/174982).

SUMMARY OF THE INVENTION

In a battery system equipped with a plurality of batteries, it is necessary to heat each battery to a predetermined temperature or higher before starting the battery. For that purpose, a heater or the like is required, and a structure of the battery system becomes complicated.

An aspect according to the present invention is made in consideration of such circumstances, and an object thereof is to provide an operating method of a fuel cell system capable of efficiently starting fuel cell stacks, in the fuel cell system equipped with the plurality of fuel cell stacks.

In order to solve the above problems and achieve the above object, the present invention has adopted the following aspects.

(1) According to an aspect of the present invention, there is provided an operating method of a fuel cell system which includes a plurality of fuel cell stacks; a refrigerant passage configured to circulate a refrigerant circulated in a first fuel cell stack among the plurality of fuel cell stacks through a second fuel cell stack among the plurality of fuel cell stacks; and a temperature acquisition unit configured to acquire a temperature of the refrigerant downstream of the first fuel cell stack and upstream of the second fuel cell stack, in which, when the temperature of the refrigerant acquired by the temperature acquisition unit is equal to or lower than a predetermined temperature, after start of the first fuel cell stack and after elapse of a delay time, the second fuel cell stack is started, and the delay time is variably set according to the temperature of the refrigerant.

(2) In the aspect of (1) above, the fuel cell system may include a first bypass flow passage provided in the refrigerant passage on a downstream side of the first fuel cell stack, and branching from the refrigerant passage to bypass the second fuel cell stack, and a first distribution device provided at a branching point between the refrigerant passage and the first bypass flow passage and capable of distributing the refrigerant of the refrigerant passage to the first bypass flow passage, and the first distribution device may change an amount of distribution of the refrigerant to the first bypass flow passage on the basis of an amount of heat input required by the second fuel cell stack when the temperature of the refrigerant is equal to or lower than a predetermined value.

(3) In the aspect of (2) above, the fuel cell system may include an IPU provided in the first bypass flow passage, a second bypass flow passage further branching from the first bypass flow passage to circulate the refrigerant through the heat exchanger, and a second distribution device provided at a branching point between the first bypass flow passage and the second bypass flow passage and capable of distributing the refrigerant of the first bypass flow passage to the second bypass flow passage, and the second distribution device may change an amount of distribution of the refrigerant to the second bypass flow passage on the basis of the amount of heat input required by the IPU when a part of the refrigerant is distributed to the first bypass flow passage.

(4) In the aspect of (2) above, the fuel cell system may include a heat exchanger provided in the first bypass flow passage, a heat supply flow passage to which heat of the refrigerant circulating in the heat exchanger is supplied, an IPU provided on the heat supply flow passage on a downstream side of the heat exchanger, a third bypass flow passage branching from the heat supply flow passage to bypass the IPU, and a third distribution device provided at a branching point between the heat supply flow passage and the third bypass flow passage and capable of distributing the refrigerant of the heat supply flow passage to the third bypass flow passage, and the third distribution device may change the amount of distribution of the refrigerant to the third bypass flow passage on the basis of the amount of heat input required by the IPU when a part of the refrigerant is distributed to the third bypass flow passage.

(5) In the aspect of (1) above, when there is no request for temperature rise of the second fuel cell stack, the first fuel cell stack may be operated in a power generation state of stable output power generation, the second fuel cell stack may be operated in a power generation state of transient response power generation, and the operation may be performed so that an output of the second fuel cell stack does not exceed an output of the first fuel cell stack.

According to the above (1), when the temperature of the refrigerant acquired by the temperature acquisition unit is equal to or lower than a predetermined temperature, after start of the first fuel cell stack and after elapse of a delay time, the second fuel cell stack is started, and the delay time is variably set according to the temperature of the refrigerant. As a result, the second fuel cell stack is heated by the refrigerant discharged from the first fuel cell stack, and the second fuel cell stack can perform the normal power generation without going through a warm-up operation. Therefore, the second fuel cell stack can be started efficiently, and the collection of heat inside the fuel cell system is improved.

In the case of the above (2), the first distribution device changes an amount of distribution of the refrigerant to the first bypass flow passage on the basis of an amount of heat input required by the second fuel cell stack when the temperature of the refrigerant is equal to or lower than a predetermined value. As a result, the second fuel cell stack 12 can be efficiently started, and the collection of heat inside the fuel cell system is improved.

In the case of the above (3), the second distribution device changes an amount of distribution of the refrigerant to the second bypass flow passage on the basis of the amount of heat input required by the IPU when a part of the refrigerant is distributed to the first bypass flow passage. As a result, since the operation can be performed so that the output of the second fuel cell stack does not exceed the output of the first fuel cell stack, it is possible to prevent a shortage of the amount of refrigerant flowing into the second fuel cell stack.

In the case of the above (4), the third distribution device changes the amount of distribution of the refrigerant to the third bypass flow passage on the basis of the amount of heat input required by the IPU when a part of the refrigerant is distributed to the third bypass flow passage. As a result, the operation can be performed so that the output of the second fuel cell stack does not exceed the output of the first fuel cell stack.

In the case of (5) above, the first fuel cell stack is operated in a power generation state of stable output power generation, the second fuel cell stack is operated in a power generation state of transient response power generation, and the operation is performed so that the output of the second fuel cell stack does not exceed the output of the fuel cell stack. Accordingly, it is possible to prevent a shortage of the amount of refrigerant flowing into the second fuel cell stack. By keeping the flow rate of the refrigerant discharged from the first fuel cell stack constant, the number of times switching between the first distribution device and the second distribution device is performed can be reduced.

DETAILED DESCRIPTION OF THE INVENTION

Hereinafter, embodiments of the present invention will be described with reference to the drawings.

Figure 1:
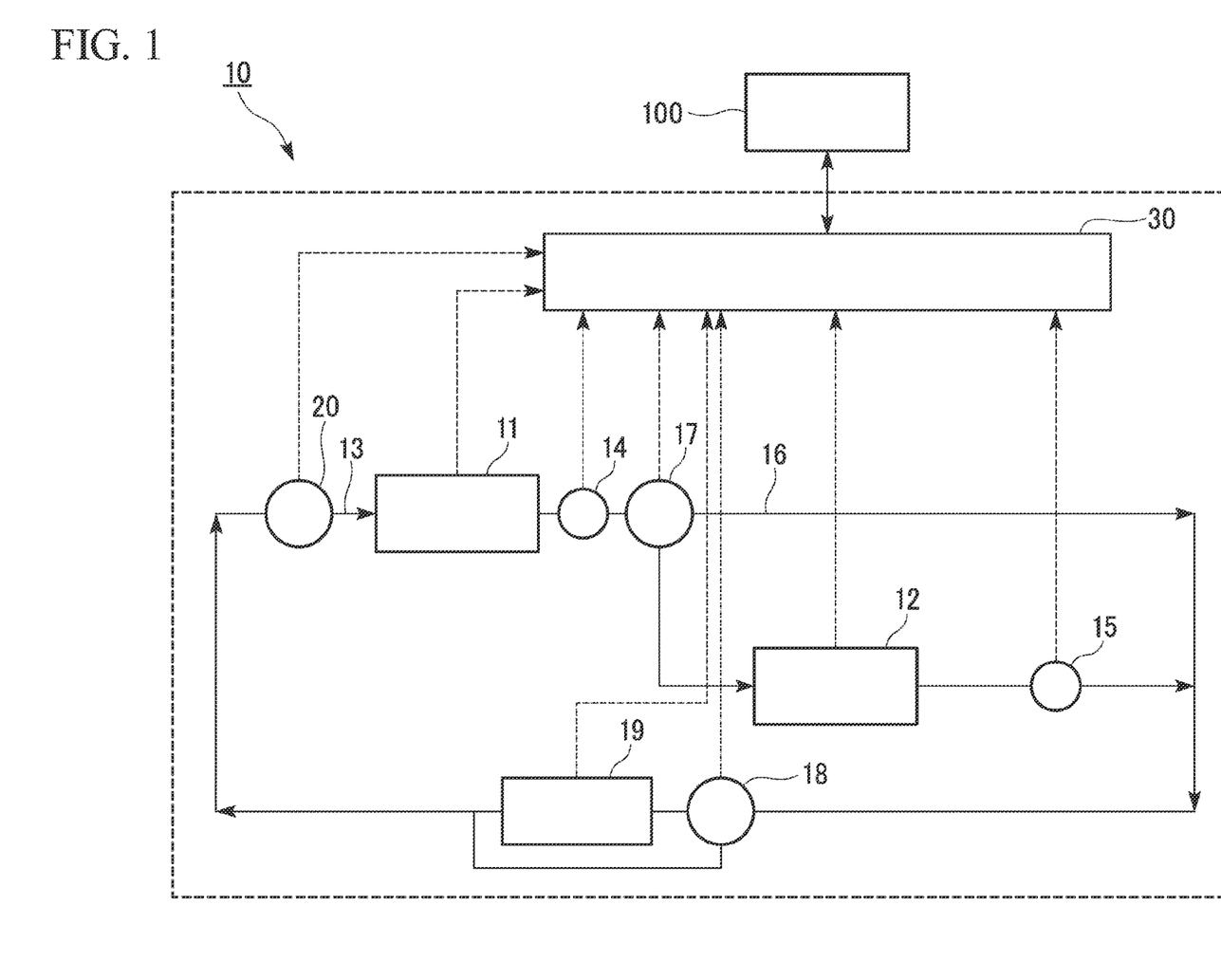
FIG. 1 is a schematic diagram showing a fuel cell system according to an embodiment of the present invention.

FIG. 1 is a schematic diagram showing a fuel cell system 10 in an embodiment. The fuel cell system 10 can be mounted on, for example, a vehicle. The vehicle may include devices such as a power storage device, a motor, a radiator, and a refrigerant tank, in addition to the fuel cell system 10. The vehicle may include a fuel cell system 10 and a control device 100 that controls other devices. The control device 100 of the vehicle may transmit and receive signals to and from a control unit (control device (FC control device)) 30 of the fuel cell system 10.

The fuel cell system 10 is equipped with a first fuel cell (FC) stack 11, a second fuel cell (FC) stack 12, a refrigerant passage 13, a first temperature acquisition unit 14, a second temperature acquisition unit 15, and an FC control device 30 which is an example of the control unit. The FC control device 30 is connected to each constituent component of the fuel cell system 10 by a signal line. A cooling system circuit including the first fuel cell stack 11, the second fuel cell stack 12, the refrigerant passage 13, the first temperature acquisition unit 14, and the second temperature acquisition unit 15 may be formed in the fuel cell system 10. The fuel cell system 10 may include a first bypass flow passage 16, a first distribution device 17, a second distribution device 18, a heat exchanger 19, and a pumping unit 20.

The first fuel cell stack 11 and the second fuel cell stack 12 are, for example, polymer electrolyte fuel cells. The polymer electrolyte fuel cell includes, for example, a plurality of stacked fuel cells, and a pair of end plates that sandwich a laminate of the plurality of fuel cells. The fuel cell includes an electrolyte electrode structure, and a pair of separators that sandwich the electrolyte electrode structure. The electrolyte electrode structure includes a solid polymer electrolyte membrane, and a fuel electrode and an oxygen electrode that sandwich the solid polymer electrolyte membrane. The solid polymer electrolyte membrane includes a cation exchange membrane or the like. The fuel electrode (anode) includes an anode catalyst, a gas diffusion layer, and the like. The oxygen electrode (cathode) includes a cathode catalyst, a gas diffusion layer, and the like. The first fuel cell stack 11 and the second fuel cell stack 12 generate power by a catalytic reaction between the fuel gas supplied from the fuel tank to the anode and an oxidizing agent gas such as oxygen-containing air supplied from an air pump to the cathode. Excess gas components and the like supplied to the fuel cell stack and not used are exhausted through a predetermined flow passage. The first fuel cell stack 11 and the second fuel cell stack 12 are provided in parallel. When the fuel cell system 10 is mounted on a vehicle, for example, the output of the second fuel cell stack 12 is adjusted by manipulating an accelerator.

The refrigerant passage 13 is a passage through which the refrigerant circulated in the first fuel cell stack 11 is circulated to the second fuel cell stack 12.

The first temperature acquisition unit 14 and the second temperature acquisition unit 15 are temperature measurers such as a thermometer. The first temperature acquisition unit 14 is provided on a downstream side of the first fuel cell stack 11 of the refrigerant passage 13 that supplies the refrigerant to the first fuel cell stack 11, and acquires the temperature of the refrigerant at that position. The second temperature acquisition unit 15 is provided on an upstream side of the second fuel cell stack 12 of the refrigerant passage 13 that supplies the refrigerant to the second fuel cell stack 12, and acquires the temperature of the refrigerant at that position.

The first bypass flow passage 16 is provided in the refrigerant passage 13 on the downstream side of the first fuel cell stack 11, branches from the refrigerant passage 13, and bypasses the second fuel cell stack 12.

The first distribution device 17 is provided at a branching point between the refrigerant passage 13 and the first bypass flow passage 16, and distributes the refrigerant of the refrigerant passage 13 to the first bypass flow passage 16. The first distribution device 17 is a valve mechanism, and includes, for example, a control valve that switches a flow rate Q, a pressure P, and the like of the refrigerant by the control of the FC control device 30.

The second distribution device 18 is provided in the refrigerant passage 13 on the downstream side of the second fuel cell stack 12, and distributes the refrigerant of the refrigerant passage 13 to the heat exchanger 19. When the second distribution device 18 is opened, the refrigerant bypasses the heat exchanger 19. The second distribution device 18 is a valve mechanism, and includes, for example, a control valve that switches the flow rate Q, the pressure P, and the like of the refrigerant by the control of the FC control device 30.

The heat exchanger 19 exchanges heat with a part of the refrigerant circulating inside the refrigerant passage 13 to lower the temperature of the refrigerant.

The pumping unit 20 is, for example, an air pump. The pumping unit 20 is provided in the refrigerant passage 13 on the upstream side of the first fuel cell stack 11. The pumping unit 22 supplies the refrigerant into a cooling system circuit depending on the required outputs of the first fuel cell stack 11 and the second fuel cell stack 12.

The FC control device 30 controls the operations of the first fuel cell stack 11, the second fuel cell stack 12, the first temperature acquisition unit 14, the second temperature acquisition unit 15, the first distribution device 17, the second distribution device 18, the heat exchanger 19, the pumping unit 20 and the like in an integrated manner.

An operating method of the fuel cell system 10 will be described.

In the fuel cell system 10, when the temperature of the refrigerant acquired by the first temperature acquisition unit 14 and the second temperature acquisition unit 15 is equal to or lower than a predetermined value, after start of the first fuel cell stack 11 and after a lapse of a delay time, the second fuel cell stack 12 is started. The delay time is variably set by the temperature of the refrigerant. The first distribution device 17 changes an amount of distribution of the refrigerant to the first bypass flow passage 16, on the basis of an amount of heat input required by the second fuel cell stack 12 when the temperature of the refrigerant is equal to or lower than a predetermined temperature.

A specific example of the operating method of the fuel cell system 10 will be described.

Figure 2:
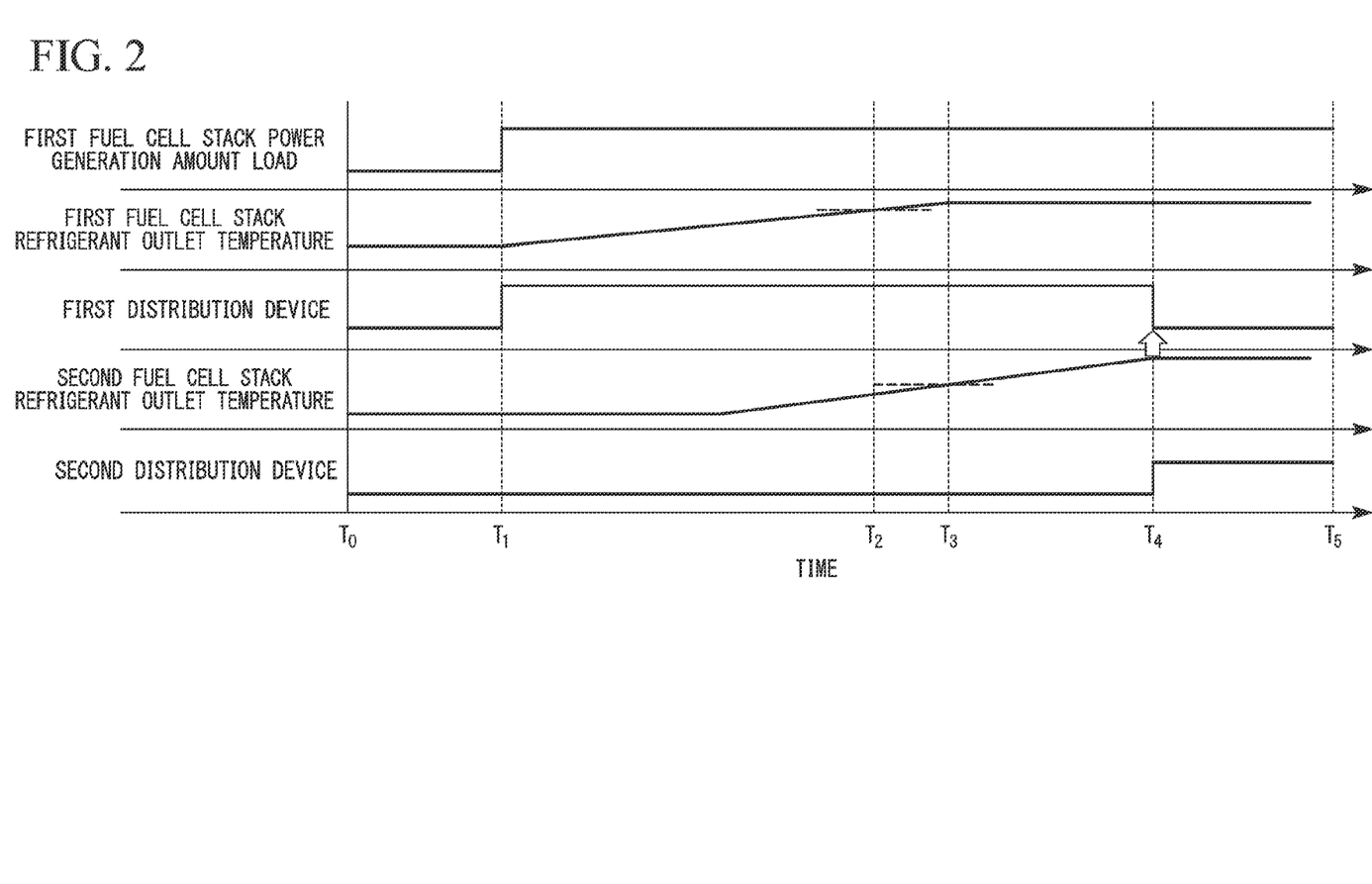
FIG. 2 is an example of a system flow showing an operating method of the fuel cell system according to the embodiment of the present invention.

FIG. 2 is an example of a system flow showing the operating method of the fuel cell system 10.

At $T_0$ to $T_1$, the first fuel cell stack 11 and the second fuel cell stack 12 are stopped and are in a standby state. The first distribution device 17 and the second distribution device 18 are closed.

At $T_1$, the first fuel cell stack 11 is started, the first distribution device 17 is opened, and the refrigerant of the refrigerant passage 13 is distributed to the first bypass flow passage 16. At $T_1$ to $T_2$, the first fuel cell stack 11 performs a warm-up power generation. The temperature of the refrigerant discharged from the first fuel cell stack 11 rises. Since the second fuel cell stack 12 is heated by the refrigerant discharged from the first fuel cell stack 11, the temperature of the refrigerant discharged from the second fuel cell stack 12 rises later than the temperature of the refrigerant discharged from the first fuel cell stack 11. The second fuel cell stack 12 is stopped and is in a standby state.

At $T_2$, the temperature of the refrigerant discharged from the first fuel cell stack 11 becomes equal to or higher than a predetermined temperature, and the first fuel cell stack 11 switches from the warm-up power generation to a normal power generation state.

At $T_1$ to $T_3$, when the temperature of the refrigerant acquired by the first temperature acquisition unit 14 and the second temperature acquisition unit 15 is equal to or lower than a predetermined value, after the start of the first fuel cell stack 11 and after the lapse of the delay time (an elapsed time from the start of the first fuel cell stack 11), that is, at a time point when the temperature of the refrigerant discharged from the first fuel cell stack 11 becomes equal to or higher than a predetermined temperature, and the temperature of the refrigerant discharged from the second fuel cell stack 12 also becomes equal to or higher than a predetermined temperature, the second fuel cell stack 12 is started. The delay time is variably set by the temperature of the refrigerant. Here, at $T_3$, the second fuel cell stack 12 is started. The second fuel cell stack 12, which is heated by the refrigerant discharged from the first fuel cell stack 11, starts the normal power generation without warming up.

At $T_3$ to $T_4$, the temperature of the refrigerant discharged from the first fuel cell stack 11 becomes almost constant. The temperature of the refrigerant discharged from the second fuel cell stack 12 rises.

At $T_4$, the first distribution device 17 changes the amount of distribution of the refrigerant to the first bypass flow passage 16, on the basis of the amount of heat input required by the second fuel cell stack 12 when the temperature of the refrigerant is equal to or lower than a predetermined value. Here, the first distribution device 17 is closed to reduce the amount of distribution of the refrigerant to the first bypass flow passage 16. On the other hand, the second distribution device 18 is opened to distribute the refrigerant of the refrigerant passage 13 to the heat exchanger 19. Accordingly, the temperature of the refrigerant discharged from the second fuel cell stack 12 becomes substantially constant.

When there is no request for raising the temperature of the second fuel cell stack 12 at $T_4$, the first fuel cell stack 11 is operated in the power generation state of a stable output power generation, the second fuel cell stack 12 is operated in the power generation state of a transient response power generation, and the operation is performed so that the output of the second fuel cell stack 12 does not exceed the output of the first fuel cell stack 11.

As described above, in the operating method of the fuel cell system of the embodiment, when the temperature of the refrigerant acquired by the first temperature acquisition unit 14 and the second temperature acquisition unit 15 is equal to or lower than a predetermined value, after the start of the first fuel cell stack 11 and after the lapse of the delay time, the second fuel cell stack 12 is started. Since the delay time is variably set by the temperature of the refrigerant, the second fuel cell stack 12 is warmed up by the refrigerant discharged from the first fuel cell stack 11. As a result, the second fuel cell stack 12 can generate the normal power without going through a warm-up operation. The first distribution device 17 changes the amount of distribution of the refrigerant to the first bypass flow passage 16 on the basis of the amount of heat input required by the second fuel cell stack 12 when the temperature of the refrigerant is equal to or lower than a predetermined value. Accordingly, the operation can be performed so that the output of the second fuel cell stack 12 does not exceed the output of the first fuel cell stack 11. As a result, the second fuel cell stack 12 can be efficiently started, and the collection of heat inside the fuel cell system is improved.

When there is no request for raising the temperature of the second fuel cell stack 12, the first fuel cell stack 11 is operated in the power generation state of the stable output power generation, the second fuel cell stack 12 is operated in the power generation state of the transient response power generation, and the operation is performed so that the output of the second fuel cell stack 12 does not exceed the output of the first fuel cell stack 11. Accordingly, it is possible to prevent a shortage of the amount of refrigerant flowing into the second fuel cell stack 12. By keeping the flow rate of the refrigerant discharged from the first fuel cell stack 11 constant, it is possible to reduce the number of times of switching between the first distribution device 17 and the second distribution device 18.

Modified Example 1

Figure 3:
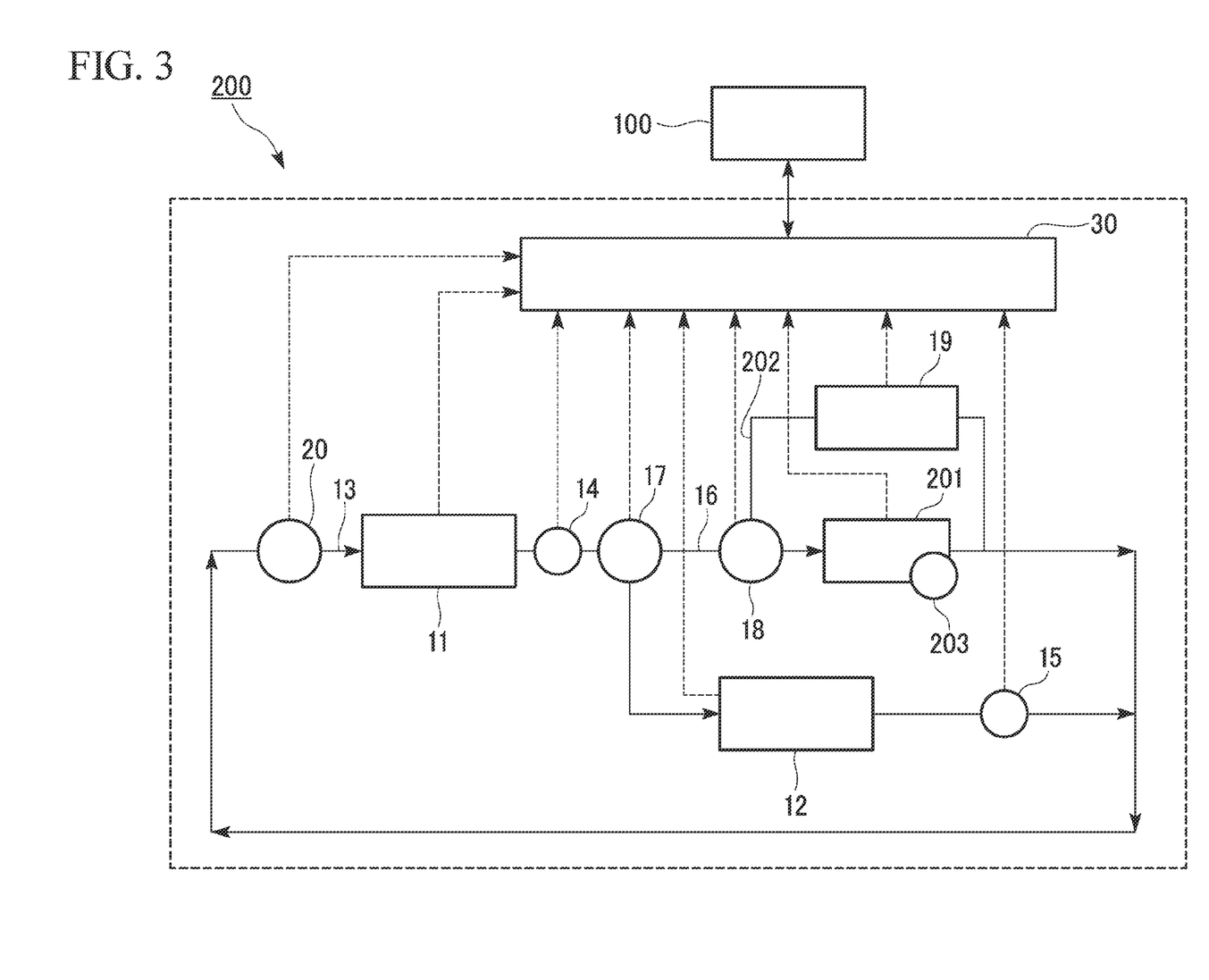
FIG. 3 is a schematic diagram showing the fuel cell system according to the embodiment of the present invention.

FIG. 3 is a schematic diagram showing a fuel cell system 200 in the embodiment.

In the fuel cell system 200, the same parts as the constituent elements in the fuel cell system 10 are denoted by the same reference numerals, the description thereof will not be provided, and only the differences will be described.

The fuel cell system 200 may include an IPU 201, a second bypass flow passage 202, and a third temperature acquisition unit 203, in addition to the configuration of the fuel cell system 10.

The intelligent power unit (IPU) 201 is a kind of power supply circuit control device. The IPU 201 is provided in the first bypass flow passage 16.

The second bypass flow passage 202 further branches from the first bypass flow passage 16 to allow the refrigerant to flow to the heat exchanger 19.

The third temperature acquisition unit 203 is provided in the IPU 201 and measures the temperature of the IPU 201.

In the fuel cell system 200, the second distribution device 18 is provided at the branching point between the first bypass flow passage 16 and the second bypass flow passage 202. The second distribution device 18 distributes the refrigerant of the first bypass flow passage 16 to the second bypass flow passage 202.

In the fuel cell system 200, the heat exchanger 19 is provided in the second bypass flow passage 202.

The operating method of the fuel cell system 200 will be described.

In the fuel cell system 200, when a part of the refrigerant is distributed to the first bypass flow passage 16, the second distribution device 18 changes the amount of distribution of the refrigerant to the second bypass flow passage 202 on the basis of the amount of heat input required by the IPU 201.

A specific example of the operating method of the fuel cell system 200 will be described.

Figure 4:
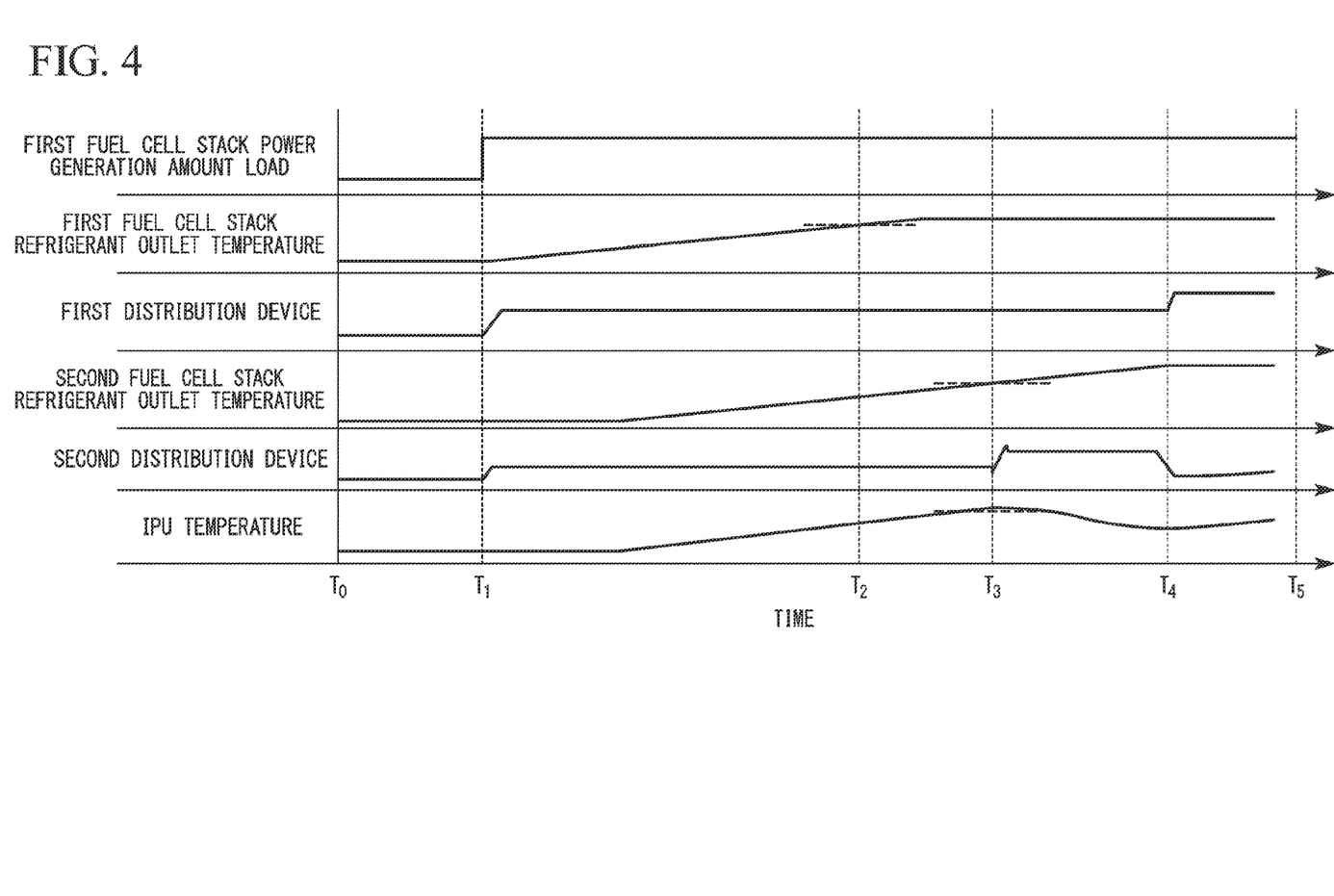
FIG. 4 is an example of a system flow showing an operating method of a fuel cell system according to the embodiment of the present invention.

FIG. 4 is an example of a system flow showing an operating method of the fuel cell system 200.

At $T_0$ to $T_1$, the first fuel cell stack 11 and the second fuel cell stack 12 are stopped and are in a standby state. The first distribution device 17 and the second distribution device 18 are closed.

At $T_1$, the first fuel cell stack 11 is started, the first distribution device 17 is opened, and the refrigerant of the refrigerant passage 13 is distributed to the first bypass flow passage 16 and the second fuel cell stack 12. Further, the second distribution device 18 is opened to allow the entire amount of the refrigerant of the first bypass flow passage 16 to flow into the IPU 201. when a part of the refrigerant is distributed to the first bypass flow passage 16, the second distribution device 18 changes the amount of distribution of the refrigerant to the second bypass flow passage 202 on the basis of the amount of heat input required by the IPU 201.

At $T_1$ to $T_2$, the first fuel cell stack 11 performs the warm-up power generation. The temperature of the refrigerant discharged from the first fuel cell stack 11 rises. Since the second fuel cell stack 12 is heated by the refrigerant discharged from the first fuel cell stack 11, the temperature of the refrigerant discharged from the second fuel cell stack 12 rises later than the temperature of the refrigerant discharged from the first fuel cell stack 11. The second fuel cell stack 12 is stopped and is in a standby state. Further, since the IPU 201 is heated by the refrigerant discharged from the first fuel cell stack 11, the temperature of the IPU 201 rises with the rise of the temperature of the refrigerant discharged from the second fuel cell stack 12.

At $T_2$, the temperature of the refrigerant discharged from the first fuel cell stack 11 becomes equal to or higher than a predetermined temperature, and the first fuel cell stack 11 switches from the warm-up power generation to the normal power generation state.

At $T_1$ to $T_3$, when the temperature of the refrigerant acquired by the first temperature acquisition unit 14 and the second temperature acquisition unit 15 is equal to or lower than a predetermined value, after the start of the first fuel cell stack 11 and after the lapse of the delay time (elapsed time after the first fuel cell stack 11 is started), that is, at the time point when the temperature of the refrigerant discharged from the first fuel cell stack 11 becomes equal to or higher than a predetermined temperature, and the temperature of the refrigerant discharged from the second fuel cell stack 12 also becomes equal to or higher than a predetermined temperature, the second fuel cell stack 12 is started. The delay time is variably set by the temperature of the refrigerant. Here, at $T_3$, the second fuel cell stack 12 is started. The second fuel cell stack 12, which is heated by the refrigerant discharged from the first fuel cell stack 11, starts the normal power generation without warming up.

At $T_3$ to $T_4$, an inflow amount of the refrigerant to the heat exchanger 19 is increased by the second distribution device 18. The temperature of the refrigerant discharged from the first fuel cell stack 11 becomes substantially constant. The temperature of the refrigerant discharged from the second fuel cell stack 12 rises. Since the inflow amount of the refrigerant into the heat exchanger 19 is increased, the temperature of the IPU 201 drops.

At $T_4$, since the temperature of the refrigerant discharged from the second fuel cell stack 12 is equal to or higher than the predetermined temperature, the inflow amount of the refrigerant to the heat exchanger 19 is further increased by the second distribution device 18. At $T_4$ to $T_5$, the temperature of the refrigerant discharged from the first fuel cell stack 11 and the second fuel cell stack 12 becomes substantially constant. The temperature of the IPU 201 rises slightly.

When there is no request for raising the temperature of the second fuel cell stack 12 at $T_4$, the first fuel cell stack 11 is operated in the power generation state of the stable output power generation, the second fuel cell stack 12 is operated in the power generation state of the transient response power generation, and the operation is performed so that the output of the second fuel cell stack 12 does not exceed the output of the first fuel cell stack 11.

As described above, in the operating method of the fuel cell system of the embodiment, when a part of the refrigerant is distributed to the first bypass flow passage 16, the second distribution device 18 changes the amount of distribution of the refrigerant to the second bypass flow passage 202 on the basis of the amount of heat input required by the IPU 201. As a result, the operation can be performed so that the output of the second fuel cell stack 12 does not exceed the output of the first fuel cell stack 11. As a result, the second fuel cell stack 12 can be efficiently started, and the collection of heat inside the fuel cell system is improved.

When there is no request for raising the temperature of the second fuel cell stack 12, the first fuel cell stack 11 is operated in the power generation state of the stable output power generation, the second fuel cell stack 12 is operated in the power generation state of the transient response power generation, and the operation is performed so that the output of the second fuel cell stack 12 does not exceed the output of the first fuel cell stack 11. Accordingly, it is possible to prevent a shortage of the amount of refrigerant flowing into the second fuel cell stack 12. By keeping the flow rate of the refrigerant discharged from the first fuel cell stack 11 constant, it is possible to reduce the number of times of switching between the first distribution device 17 and the second distribution device 18.

Modified Example 2

Figure 5:
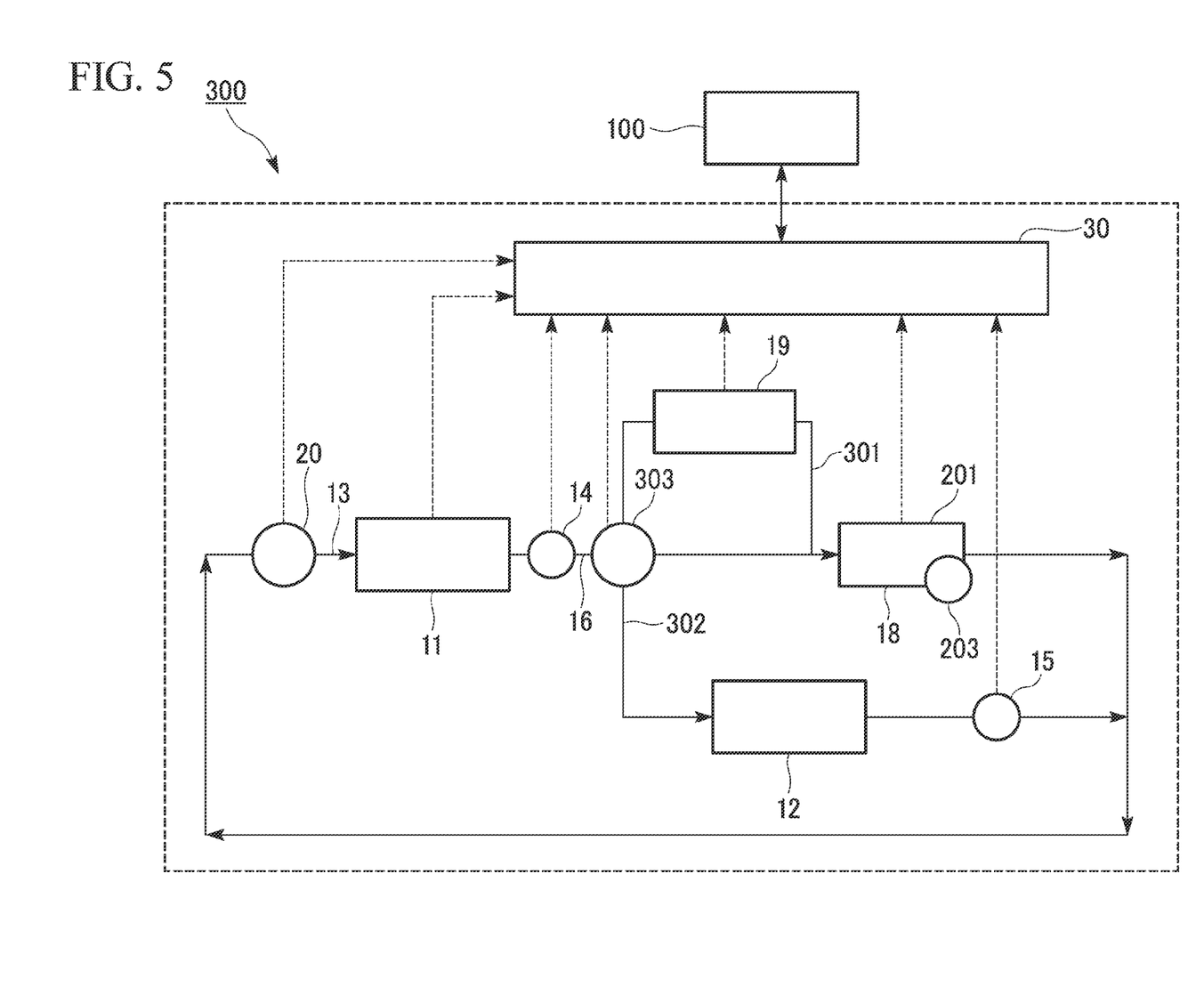
FIG. 5 is a schematic diagram showing the fuel cell system according to the embodiment of the present invention.

FIG. 5 is a schematic diagram showing a fuel cell system 300 in the embodiment.

In the fuel cell system 300, the same parts as the constituent elements of the fuel cell system 10 and the fuel cell system 200 are denoted by the same reference numerals, the description thereof will not be provided, and only the differences will be described.

The fuel cell system 300 includes the first fuel cell stack 11, the second fuel cell stack 12, the refrigerant passage 13, the first temperature acquisition unit 14, the second temperature acquisition unit 15, the first bypass flow passage 16, the heat exchanger 19, the pumping unit 20, the FC control device 30, the IPU 201, the third temperature acquisition unit 203, a heat supply flow passage 301, a third bypass flow passage 302, and a third distribution device 303.

The heat supply flow passage 301 is provided in the first bypass flow passage 16.

The third bypass flow passage 302 branches from the heat supply flow passage 301 and bypasses the IPU 201.

The third distribution device 303 is provided at a branching point between the heat supply flow passage 301 and the third bypass flow passage 302, and distributes the refrigerant of the heat supply flow passage 301 to the third bypass flow passage 302.

In the fuel cell system 300, the heat exchanger 19 is provided in the first bypass flow passage 16.

In the fuel cell system 300, the IPU 201 is provided on the heat supply flow passage 301 on the downstream side of the heat exchanger 19.

The operating method of the fuel cell system 300 will be explained.

In the fuel cell system 300, the third distribution device 303 changes the amount of distribution of the refrigerant to the third bypass flow passage 302 on the basis of the amount of heat input required by the IPU 201, when a part of the refrigerant is distributed to the third bypass flow passage 302.

A specific example of the operating method of the fuel cell system 200 will be described.

Figure 6:
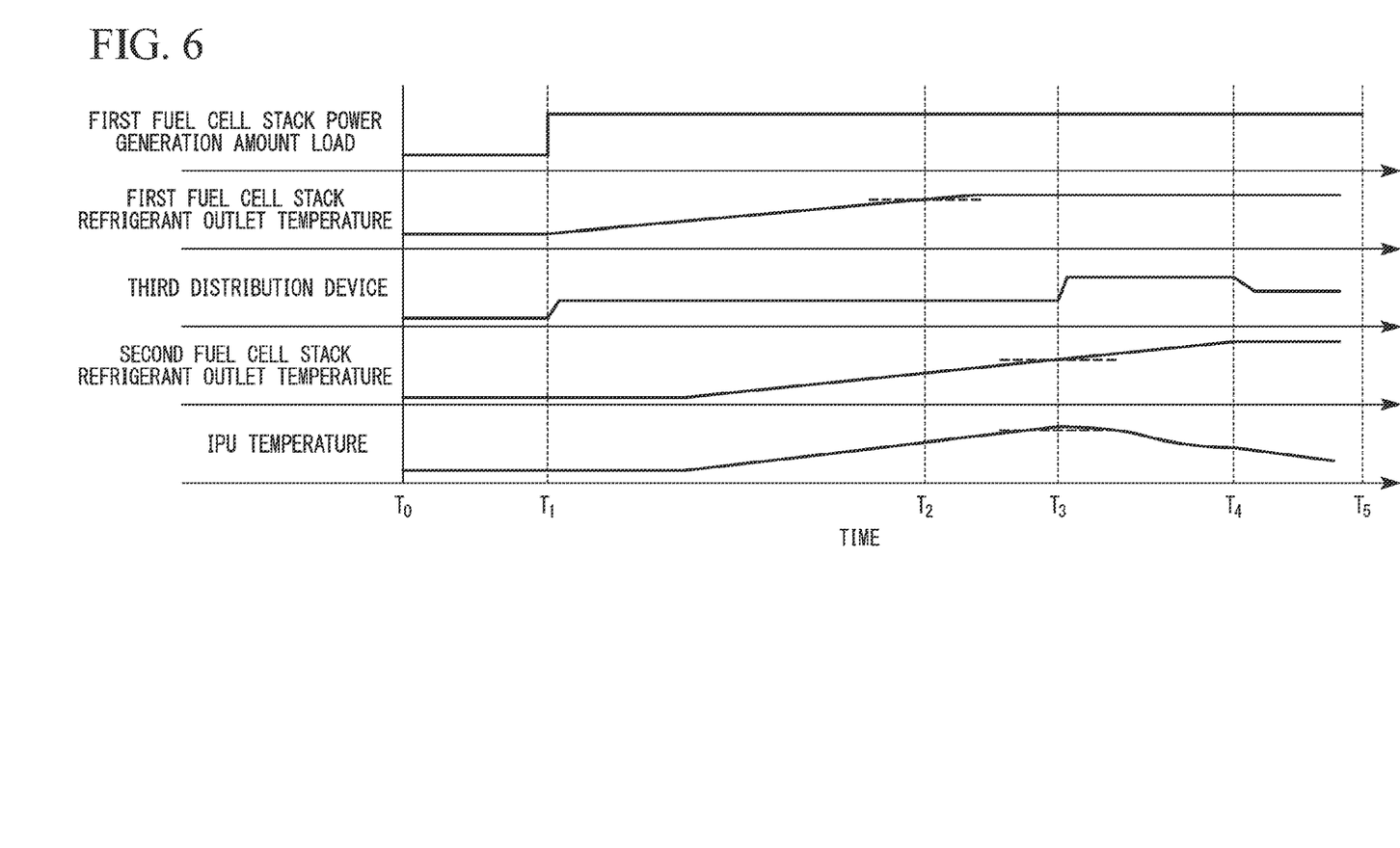
FIG. 6 is an example of a system flow showing the operating method of the fuel cell system according to the embodiment of the present invention.

FIG. 6 is an example of a system flow showing the operating method of the fuel cell system 300.

At $T_0$ to $T_1$, the first fuel cell stack 11 and the second fuel cell stack 12 are stopped and are in a standby state. The third distribution device 303 is closed.

At $T_1$, the first fuel cell stack 11 is started, and the third distribution device 303 is opened to distribute the refrigerant of the refrigerant passage 13 to the first bypass flow passage 16 and the third bypass flow passage 302. At $T_1$ to $T_2$, the first fuel cell stack 11 performs the warm-up power generation. The temperature of the refrigerant discharged from the first fuel cell stack 11 rises. Since the second fuel cell stack 12 is heated by the refrigerant discharged from the first fuel cell stack 11, the temperature of the refrigerant discharged from the second fuel cell stack 12 rises later than the temperature of the refrigerant discharged from the first fuel cell stack 11. The second fuel cell stack 12 is stopped and is in a standby state. Since the IPU 201 is heated by the refrigerant discharged from the first fuel cell stack 11, the temperature of the IPU 201 rises with the rise of the temperature of the refrigerant discharged from the second fuel cell stack 12.

At $T_2$, the temperature of the refrigerant discharged from the first fuel cell stack 11 becomes equal to or higher than a predetermined temperature, and the first fuel cell stack 11 switches from the warm-up power generation to the normal power generation state.

At $T_1$ to $T_3$, when the temperature of the refrigerant acquired by the first temperature acquisition unit 14 and the second temperature acquisition unit 15 is equal to or lower than a predetermined value, after the start of the first fuel cell stack 11, and after the lapse of the delay time (elapsed time after the first fuel cell stack 11 is started), that is, at the time point when the temperature of the refrigerant discharged from the first fuel cell stack 11 becomes equal to or higher than a predetermined temperature, and the temperature of the refrigerant discharged from the second fuel cell stack 12 also becomes equal to or higher than the predetermined temperature, the second fuel cell stack 12 is started. The delay time is variably set by the temperature of the refrigerant. Here, at $T_3$, the second fuel cell stack 12 is started. The second fuel cell stack 12, which is heated by the refrigerant discharged from the first fuel cell stack 11, starts the normal power generation without warming up.

At $T_3$ to $T_4$, the refrigerant is distributed to the second fuel cell stack 12 and the heat exchanger 19 by the third distribution device 303. The temperature of the refrigerant discharged from the first fuel cell stack 11 becomes substantially constant. The temperature of the refrigerant discharged from the second fuel cell stack 12 rises. Since the inflow amount of the refrigerant into the heat exchanger 19 is increased, the temperature of the IPU 201 drops.

At $T_4$, since the temperature of the refrigerant discharged from the second fuel cell stack 12 is equal to or higher than the predetermined temperature, the inflow amount of the refrigerant into the heat exchanger 19 is further increased by the third distribution device 303. At $T_4$ to $T_5$, the temperature of the refrigerant discharged from the first fuel cell stack 11 and the second fuel cell stack 12 becomes substantially constant. The temperature of the IPU 201 drops.

When there is no request for raising the temperature of the second fuel cell stack 12 at $T_4$, the first fuel cell stack 11 is operated in the power generation state of the stable output power generation, the second fuel cell stack 12 is operated in the power generation state of the transient response power generation, and the operation is performed so that the output of the second fuel cell stack 12 does not exceed the output of the first fuel cell stack 11.

As described above, in the operating method of the fuel cell system of the embodiment, the third distribution device 303 changes the amount of distribution of the refrigerant to the third bypass flow passage 302 on the basis of the amount of heat input required by the IPU 201, when a part of the refrigerant is distributed to the third bypass flow passage 302. As a result, the operation can be performed so that the output of the second fuel cell stack 12 does not exceed the output of the first fuel cell stack 11. As a result, the second fuel cell stack 12 can be efficiently started, and the collection of heat inside the fuel cell system is improved.

When there is no request for raising the temperature of the second fuel cell stack 12, the first fuel cell stack 11 is operated in the power generation state of the stable output power generation, the second fuel cell stack 12 is operated in the power generation state of the transient response power generation, and the operation is performed so that the output of the second fuel cell stack 12 does not exceed the output of the first fuel cell stack 11. Accordingly, it is possible to prevent a shortage of the amount of refrigerant flowing into the second fuel cell stack 12. By keeping the flow rate of the refrigerant discharged from the first fuel cell stack 11 constant, it is possible to reduce the number of times of switching the third distribution device 303.

Modified Example 3

Figure 7:
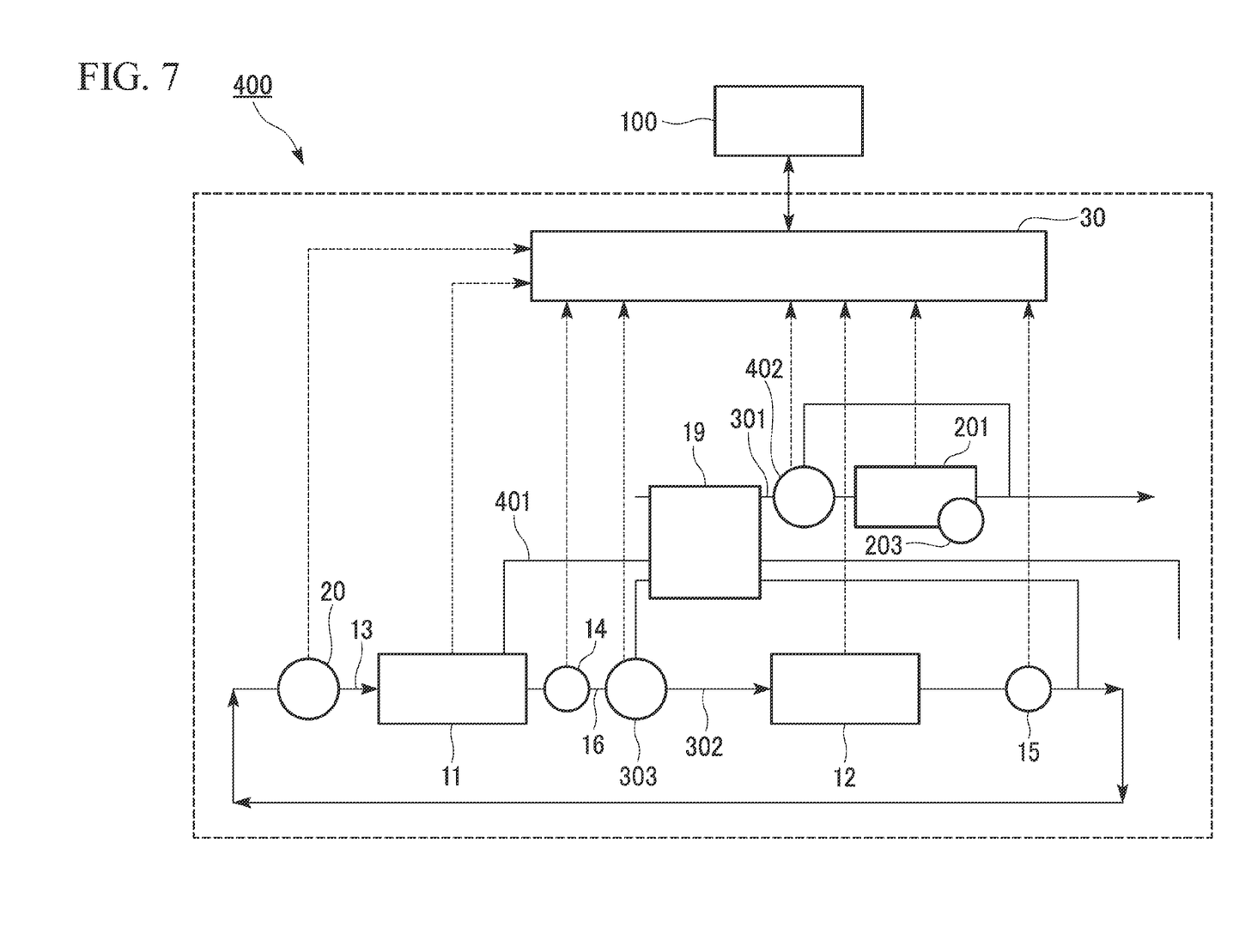
FIG. 7 is a schematic diagram showing the fuel cell system according to the embodiment of the present invention.

FIG. 7 is a schematic diagram showing a fuel cell system 400 in the embodiment.

In the fuel cell system 400, the same parts as the constituent elements of the fuel cell system 10, the fuel cell system 200, and the fuel cell system 300 are denoted by the same reference numerals, the description thereof will not be provided, and only the differences will be described.

The fuel cell system 400 includes the first fuel cell stack 11, the second fuel cell stack 12, the refrigerant passage 13, the first temperature acquisition unit 14, the second temperature acquisition unit 15, the first bypass flow passage 16, the heat exchanger 19, the pumping unit 20, the FC control device 30, the IPU 201, the third temperature acquisition unit 203, the heat supply flow passage 301, the third bypass flow passage 302, the third distribution device 303, an air waste heat passage 401, and a fourth distribution device 402.

The air waste heat passage 401 is connected to the first fuel cell stack 11 and discharges the air of the first fuel cell stack 11.

The fourth distribution device 402 is provided on the heat supply flow passage 301 and transfers heat of the heat exchanger 19 to the IPU 201.

A specific example of the operating method of the fuel cell system 400 will be described.

Figure 8:
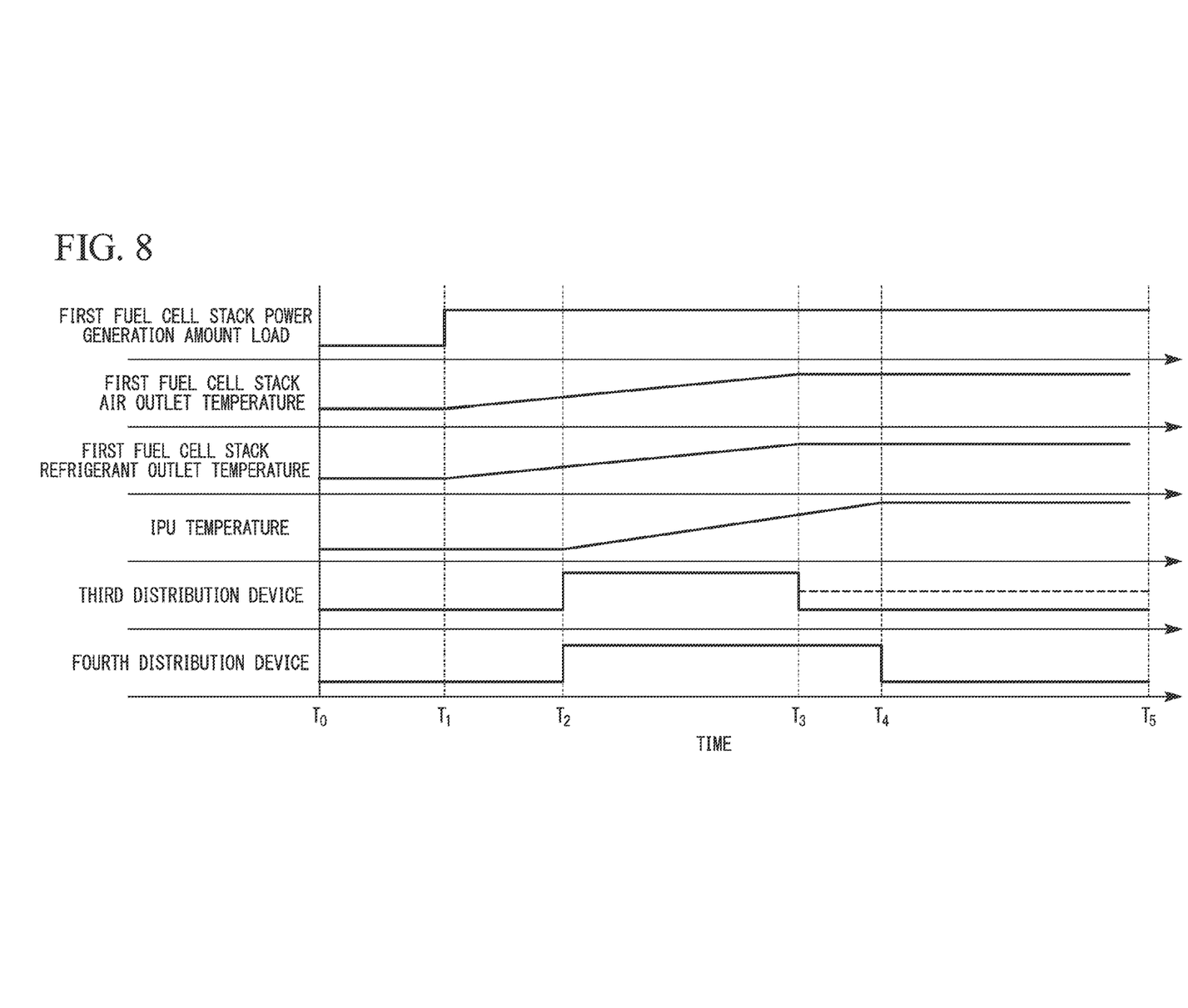
FIG. 8 is an example of a system flow showing the operating method of the fuel cell system according to the embodiment of the present invention.

FIG. 8 is an example of a system flow showing the operating method of the fuel cell system 400.

At $T_0$ to $T_1$, the first fuel cell stack 11 is stopped and is in the standby state. The third distribution device 303 and the fourth distribution device 402 are closed.

At $T_1$, the first fuel cell stack 11 is started. The third distribution device 303 and the fourth distribution device 402 are closed. At $T_1$ to $T_2$, the first fuel cell stack 11 performs the warm-up power generation. The temperature of the refrigerant discharged from the first fuel cell stack 11 rises. The temperature of the air discharged from the first fuel cell stack 11 rises. The temperature of the IPU 201 does not change.

At $T_2$, the third distribution device 303 and the fourth distribution device 402 are opened to allow the refrigerant discharged from the first fuel cell stack 11 and the refrigerant heated by air to flow into the IPU 201. Then, at $T_2$ to $T_3$, the IPU 201 is heated by the refrigerant, and the temperature of the IPU 201 rises.

At $T_3$, the third distribution device 303 is closed. Then, at $T_3$ to $T_4$, the temperatures of the refrigerant and the air discharged from the first fuel cell stack 11 become substantially constant. Since the fourth distribution device 402 is opened, the temperature of the IPU 201 continues to rise.

At $T_4$, the fourth distribution device 402 is closed. At $T_4$ to $T_5$, the temperature of the IPU 201 becomes almost constant.

As described above, the operating method of the fuel cell system of the embodiment can adjust the inflow amount of the refrigerant and air discharged from the first fuel cell stack 11 to the IPU 201 and can adjust the temperature of the IPU 201, by adjusting the third distribution device 303 and the fourth distribution device 402.

In the above-described embodiment, although an example in which the fuel cell system is mounted on a fuel cell vehicle that uses the electric power generated by the fuel cell as the electric power for traveling or the electric power for operating an in-vehicle device has been described, the system may be mounted on vehicles such as two-wheeled vehicles, three-wheeled vehicles, four-wheeled vehicles, and other moving objects (e.g., ships, flying objects, robots), and may be mounted on stationary fuel cell systems.

The embodiments of the present invention are presented as an example, and are not intended to limit the scope of the invention. These embodiments can be implemented in various other embodiments, and various omissions, replacements, and changes can be made without departing from the gist of the invention. These embodiments and variations thereof are included in the scope of the invention described in the claims and the equivalent scope thereof, as are included in the scope and gist of the invention.

What is claimed is:

1. An operating method of a fuel cell system:
   the fuel cell system comprising:
   a plurality of fuel cell stacks,
   a refrigerant passage configured to circulate a refrigerant circulated in a first fuel cell stack among the plurality of fuel cell stacks through a second fuel cell stack among the plurality of fuel cell stacks,
   a temperature acquisition unit configured to acquire a temperature of the refrigerant downstream of the first fuel cell stack and upstream of the second fuel cell stack,
   a first bypass flow passage provided in the refrigerant passage on a downstream side of the first fuel cell stack, and branching from the refrigerant passage to bypass the second fuel cell stack,
   a first distribution device provided at a branching point between the refrigerant passage and the first bypass flow passage and capable of distributing the refrigerant of the refrigerant passage to the first bypass flow passage,
   an IPU provided in the first bypass flow passage,
   a second bypass flow passage further branching from the first bypass flow passage to circulate the refrigerant through a heat exchanger, and
   a second distribution device provided at a branching point between the first bypass flow passage and the second bypass flow passage and capable of distributing the refrigerant of the first bypass flow passage to the second bypass flow passage,
   the operating method comprising:
   when the temperature of the refrigerant acquired by the temperature acquisition unit is equal to or lower than a predetermined temperature, after start of the first fuel cell stack and after elapse of a delay time, starting the second fuel cell stack;
   setting the delay time to be variably set according to the temperature of the refrigerant;
   changing, by the first distribution device, an amount of distribution of the refrigerant to the first bypass flow passage on the basis of an amount of heat input required by the second fuel cell stack when the temperature of the refrigerant is equal to or lower than a predetermined value; and changing, by the second distribution device, an amount of distribution of the refrigerant to the second bypass flow passage on the basis of an amount of heat input required by the IPU when a part of the refrigerant is distributed to the first bypass flow passage.

2. The operating method of the fuel cell system, according to claim 1, wherein the fuel cell system further comprises:
the heat exchanger provided in the first bypass flow passage,
a heat supply flow passage to which heat of the refrigerant circulating in the heat exchanger is supplied,
an IPU provided on the heat supply flow passage on a downstream side of the heat exchanger,
a third bypass flow passage branching from the heat supply flow passage to bypass the IPU, and
a third distribution device provided at a branching point between the heat supply flow passage and the third bypass flow passage and capable of distributing the refrigerant of the heat supply flow passage to the third bypass flow passage, and wherein the operating method further comprises:
changing, by the third distribution device, an amount of distribution of the refrigerant to the third bypass flow passage on the basis of an amount of heat input required by the IPU when a part of the refrigerant is distributed to the third bypass flow passage.

3. An operating method of a fuel cell system:
the fuel cell system comprising:
a plurality of fuel cell stacks,
a refrigerant passage configured to circulate a refrigerant circulated in a first fuel cell stack among the plurality of fuel cell stacks through a second fuel cell stack among the plurality of fuel cell stacks,
a temperature acquisition unit configured to acquire a temperature of the refrigerant downstream of the first fuel cell stack and upstream of the second fuel cell stack,
a first bypass flow passage provided in the refrigerant passage on a downstream side of the first fuel cell stack, and branching from the refrigerant passage to bypass the second fuel cell stack,
a first distribution device provided at a branching point between the refrigerant passage and the first bypass flow passage and capable of distributing the refrigerant of the refrigerant passage to the first bypass flow passage,
the heat exchanger provided in the first bypass flow passage,
a heat supply flow passage to which heat of the refrigerant circulating in the heat exchanger is supplied,
an IPU provided on the heat supply flow passage on a downstream side of the heat exchanger,
a third bypass flow passage branching from the heat supply flow passage to bypass the IPU, and
a third distribution device provided at a branching point between the heat supply flow passage and the third bypass flow passage and capable of distributing the refrigerant of the heat supply flow passage to the third bypass flow passage, the operating method comprising:
when the temperature of the refrigerant acquired by the temperature acquisition unit is equal to or lower than a predetermined temperature, after start of the first fuel cell stack and after elapse of a delay time, starting the second fuel cell stack; and
setting the delay time to be variably set according to the temperature of the refrigerant;
changing, by the first distribution device, an amount of distribution of the refrigerant to the first bypass flow passage on the basis of an amount of heat input required by the second fuel cell stack when the temperature of the refrigerant is equal to or lower than a predetermined value; and
changing, by the third distribution device, an amount of distribution of the refrigerant to the third bypass flow passage on the basis of an amount of heat input required by the IPU when a part of the refrigerant is distributed to the third bypass flow passage.

* * * * *